(12) United States Patent
Harvey

(10) Patent No.: US 11,469,600 B2
(45) Date of Patent: Oct. 11, 2022

(54) ELECTRICAL ENERGY STORE, DEVICE AND METHOD FOR OPERATING AN ELECTRICAL ENERGY STORE

(71) Applicant: Robert Bosch GmbH, Stuttgart (DE)

(72) Inventor: Marc-Andre Harvey, Lochaber-Partie-Ouest (CA)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/364,952

(22) Filed: Jul. 1, 2021

(65) Prior Publication Data
US 2022/0006300 A1     Jan. 6, 2022

(30) Foreign Application Priority Data

Jul. 1, 2020    (DE) ..................... 10 2020 208 208.1

(51) Int. Cl.
    *H02J 7/00*      (2006.01)
    *B60R 16/033*    (2006.01)

(52) U.S. Cl.
    CPC .......... *H02J 7/0013* (2013.01); *B60R 16/033* (2013.01)

(58) Field of Classification Search
    CPC .............................. H02J 7/0013; B60R 16/033
    USPC .................................................. 307/9.1, 10.1
See application file for complete search history.

(56) References Cited

U.S. PATENT DOCUMENTS

| | | |
|---|---|---|
| 2013/0200693 A1 | 8/2013 | Butzmann et al. |
| 2014/0184162 A1* | 7/2014 | Takahashi ......... H01M 10/0525 320/128 |
| 2019/0126761 A1* | 5/2019 | Verbridge ........... H01M 10/441 |

FOREIGN PATENT DOCUMENTS

| | | |
|---|---|---|
| DE | 10330834 A1 | 2/2005 |
| DE | 102010037094 A1 | 2/2012 |
| DE | 102012006247 A1 | 10/2013 |
| DE | 102014201351 A1 | 7/2015 |
| DE | 102017206834 A1 | 10/2018 |
| EP | 3358701 A2 | 8/2018 |

* cited by examiner

*Primary Examiner* — Michael R. Fin
(74) *Attorney, Agent, or Firm* — Michael Best & Friedrich LLP

(57) ABSTRACT

Electrical energy store (1) having at least two electrical energy storage modules (3, 13, 23, 33), a control unit (2), a voltage connection (11) and switching elements (4, 6, 14, 16, 24, 26, 34, 36). In one example, the electrical energy store (1) has a first voltage rail (9) and a second voltage rail (10) that are each connected to the voltage connection (11), and the electrical energy storage modules (3, 13, 23, 33) are configured to be connected to the first voltage rail (9) or to the second voltage rail (10) or to one another by means of the switching elements (4, 6, 14, 16, 24, 26, 34, 36).

13 Claims, 5 Drawing Sheets

ELECTRICAL ENERGY STORE, DEVICE AND METHOD FOR OPERATING AN ELECTRICAL ENERGY STORE

BACKGROUND OF THE INVENTION

The present invention relates to an electrical energy store, a device and a method for operating an electrical energy store.

DE 10 2017 206 834 A1 discloses a circuit arrangement and a charging method for an electrical energy storage system.

EP 3 358 701 B1 discloses a charging circuit with a DC-to-DC converter for an electrical energy storage system.

US 2013/0200693 A1 shows a coupling device and a battery module that has an integrated PWM inverter and replaceable battery cells.

DE 103 30 834 A1 discloses a method and a device for supplying to at least one load.

SUMMARY OF THE INVENTION

The essence of the invention for the electrical energy store, having at least two electrical energy storage modules, a control unit, a voltage connection and switching elements, is that the electrical energy store has a first voltage rail and a second voltage rail that are each connected to the voltage connection, wherein the electrical energy storage modules can be connected to the first voltage rail or to the second voltage rail or to one another by means of the switching elements.

The background of the invention is that, depending on the operating mode of the electrical energy store, the electrical energy storage modules can be connected in parallel or in a series circuit or partly in parallel and partly in a series circuit. In addition, it is possible to balance the states of charge of the electrical energy storage modules by partly discharging an electrical energy storage module with a relatively high state of charge by means of the control unit and simultaneously charging the other electrical energy storage modules.

Advantageously, the electrical energy store can therefore be charged using different charging voltages. The electrical energy storage modules here are connected in a series circuit to allow charging using a high charging voltage at fast charging stations, or the electrical energy stores are connected in parallel to allow charging using a lower charging voltage at a household power connection. The electrical energy store can advantageously be discharged at a medium operating voltage, which is achieved by virtue of groups of electrical energy stores connected in series being connected in parallel.

Further advantageous embodiments of the present invention are the subject of the dependent claims.

According to one advantageous configuration, the control unit is in each case electrically conductively connected to the electrical energy storage modules and/or the first voltage rail and/or the second voltage rail. As a result, an individual electrical energy storage module can be discharged in a controlled manner by the control unit and the charge can be used to charge the other electrical energy storage modules by means of the voltage rails.

It is advantageous in this case if the control unit is electrically conductively connected to the respective electrical energy storage module by means of a respective connecting means, in particular wherein the respective connecting means has a lower dielectric strength than the first and/or second voltage rail. The connecting means here is designed for the voltage of an individual electrical energy storage module and the respective voltage rail is designed for the sum of the voltages of all the electrical energy storage modules.

It is furthermore advantageous if each electrical energy storage module respectively has a first electrical connection and a second electrical connection, wherein the first electrical connection of a respective electrical energy storage module can be connected to the first voltage rail or the second electrical connection of a further electrical energy storage module by means of a first switching element, wherein the second electrical connection of a respective electrical energy storage module can be connected to the second voltage rail or the first electrical connection of a further electrical energy storage module by means of a second switching element. In this case, the electrical connections to form the series circuit of electrical energy storage modules can be connected to one another directly by means of the switching elements.

It is advantageous in this case if the switching elements are embodied as triple switching elements, in particular wherein the switching elements each have a neutral position. The switching elements can be in the form of mechanical switches or semiconductor switches for this purpose.

It is furthermore advantageous if the control unit is connected to the electrical energy storage modules and the switching elements, in each case in a data-carrying manner, in particular wherein the control unit is configured to evaluate status parameters of the electrical energy storage modules and to actuate the switching elements on the basis of the status parameters. As a result, the respective present operating state of the control unit can be monitored and the operating mode of the electrical energy store can be adapted to the respective operating state of the electrical energy storage modules by adjusting the switching elements.

Advantageously, each electrical energy storage module has electrical energy storage cells that are arranged in a series circuit, wherein each electrical energy storage module has the same number of electrical energy storage cells. Therefore, the electrical energy storage modules each have the same rated voltage and can be connected both in parallel and in a series circuit.

The essence of the invention for the device, in particular vehicle, is that the device has an electrical energy store as described above or according to one of the claims relating to the electrical energy store.

The background of the invention is that the electrical energy store can be adapted to the operating mode of the device in a simple manner.

The essence of the invention for the method for operating an electrical energy store as described above or according to one of the claims relating to the electrical energy store is that the method has the temporally successive method steps wherein, in a first method step, a state of charge of the electrical energy store is determined and an operating mode of the electrical energy store is set, wherein, in a second method step, switching elements are switched between electrical energy storage modules and voltage rails of the electrical energy store, wherein, in a third method step, the electrical energy storage modules are electrically conductively connected to a charging device or a load, wherein, in a fourth method step, the method is continued or ended with the first method step.

The background of the invention is that, depending on the operating mode of the electrical energy store, the electrical energy storage modules can be connected in parallel or in a series circuit or partly in parallel and partly in a series circuit. In addition, it is possible to balance the states of charge of the electrical energy storage modules by partly discharging an electrical energy storage module with a relatively high state of charge by means of the control unit and simultaneously charging the other electrical energy storage modules.

According to one advantageous configuration, in the second method step, according to a first variant, all the electrical energy storage modules are connected in parallel, or, according to a second variant, connected in a series circuit, or, according to a third variant, groups of electrical energy storage modules connected in series are connected in parallel, or, according to a fourth variant, a first electrical energy storage module is electrically conductively connected to the control unit and the other electrical energy storage modules are connected in parallel. The electrical energy store can therefore be charged using different charging voltages. The electrical energy storage modules here are connected in a series circuit to allow charging using a high charging voltage at fast charging stations, or the electrical energy stores are connected in parallel to allow charging using a lower charging voltage at a household power connection. The electrical energy store can advantageously be discharged at a medium operating voltage, which is achieved by virtue of groups of electrical energy stores connected in series being connected in parallel. The fourth variant allows voltage balancing of the electrical energy storage modules.

It is advantageous in this case if, according to the fourth variant, the other electrical energy storage modules are fed from the first electrical energy storage module. Therefore, voltage balancing of the electrical energy storage modules is made possible both during charging pauses and without a charging device connected to the electrical energy store.

Advantageously, the control unit in this case limits the current from the first electrical energy storage module. As a result, the voltage balancing of the electrical energy storage modules can be controlled and the electrical energy storage modules are protected from short circuits or deep discharge, for example.

Advantageously, the electrical energy storage module that has the highest state of charge and/or the highest voltage is selected as the first electrical energy storage module.

It is furthermore advantageous if, in the first method step, a check is performed to determine whether the electrical energy store is connected to a charging device and, if it is, which charging voltage the charging device has. As a result, the configuration of the switching elements can be adapted to the charging voltage of the charging device.

It is advantageous in this case if charging or fast charging or discharging or voltage balancing of the electrical energy storage modules is selected as the operating mode.

The above configurations and developments can be combined with one another as desired, where appropriate. Further possible configurations, developments and implementations of the invention also comprise combinations that are not explicitly mentioned of features of the invention that are described above or below with respect to the exemplary embodiments. In particular, a person skilled in the art will in this case also add individual aspects as improvements or additions to the respective basic form of the present invention.

BRIEF DESCRIPTION OF THE DRAWINGS

In the section that follows, the invention is explained on the basis of exemplary embodiments, from which further inventive features can arise, but to which the scope of the invention is not restricted. The exemplary embodiments are illustrated in the drawings.

In the figures.

DETAILED DESCRIPTION

Figure 1:
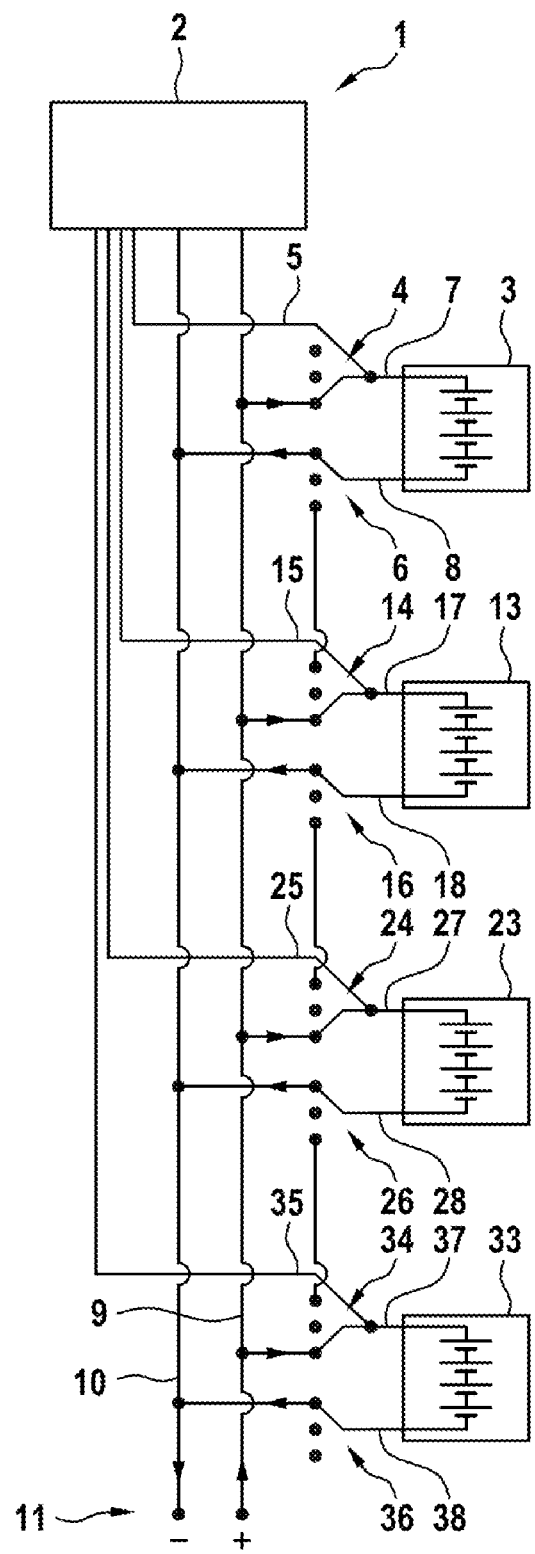
FIG. 1 shows a circuit diagram of an electrical energy store 1 according to the invention in a first switching configuration.

FIGS. 1 to 4 illustrate the electrical energy store 1 in different switching configurations. The flow of current is illustrated by means of arrows in this case.

The electrical energy store 1 has at least two electrical energy storage modules (3, 13, 23, 33), a control unit 2, a first voltage rail 9, a second voltage rail 10, a voltage connection 11 and a multiplicity of switching elements (4, 6, 14, 16, 24, 26, 34, 36).

Each electrical energy storage module (3, 13, 23, 33) has electrical energy storage cells, a first electrical connection means (7, 17, 27, 37) and a second electrical connection means (8, 18, 28, 38). In this case, the first electrical connection means (7, 17, 27, 37) is embodied as a positive pole of the respective electrical energy storage module (3, 13, 23, 33) and the second electrical connection means (8, 18, 28, 38) is embodied as a negative pole of the respective electrical energy storage module (3, 13, 23, 33).

Preferably, the electrical energy storage cells of each electrical energy storage module (3, 13, 23, 33) are arranged in a series circuit, wherein each electrical energy storage module (3, 13, 23, 33) has the same number of electrical energy storage cells.

Each first electrical connection means (7, 17, 27, 37) can be electrically conductively connected to a second switching element (6, 16, 26, 36) of a further electrical energy storage module (3, 13, 23, 33) or to the first voltage rail 9 by means of a first switching element (4, 14, 24, 34). Additionally, each first switching element (4, 14, 24, 34) has a neutral position in which the first electrical connection means (7, 17, 27, 37) is not connected to the first voltage rail 9 or to the second switching element (6, 16, 26, 36) of a further electrical energy storage module (3, 13, 23, 33).

Each second electrical connection means (8, 18, 28, 38) can be electrically conductively connected to a first switching element (4, 14, 24, 34) of a further electrical energy storage module (3, 13, 23, 33) or to the second voltage rail 10 by means of a second switching element (6, 16, 26, 36). Additionally, each second switching element (6, 16, 26, 36) has a neutral position in which the second electrical connection means (8, 18, 28, 38) is not connected to the second voltage rail 10 or to the first switching element (4, 14, 24, 34) of a further electrical energy storage module (3, 13, 23, 33).

The first and second switching elements (4, 6, 14, 16, 24, 26, 34, 36) are respectively embodied as triple switches for this purpose.

A first switching element 4 of a first electrical energy storage module 3 either connects the first connection means 7 of the first electrical energy storage module 3 to the first voltage rail 9 or it is switched to the neutral position.

A second switching element 36 of a last electrical energy storage module 33 either connects the second connection means 38 of the last electrical energy storage module 33 to the second voltage rail 10 or it is switched to the neutral position.

The control unit 2 is electrically conductively connected to the first connection means (7, 17, 27, 37) of each electrical energy storage module (3, 13, 23, 33) by means of a respective connecting means (5, 15, 25, 35). The respective connecting means (5, 15, 25, 35) in this case has a lower dielectric strength than the respective voltage rail (9, 10).

The control unit 2 is connected to each switching element (4, 6, 14, 16, 24, 26, 34, 36) in a signal-carrying manner and is configured to control the switching elements (4, 6, 14, 16, 24, 26, 34, 36).

The control unit 2 is connected to each electrical energy storage module (3, 13, 23, 33), in particular to respective sensors of the electrical energy storage modules (3, 13, 23, 33), in a signal-carrying manner. In this case, the control unit 2 is configured to capture and to evaluate at least one status parameter of the respective electrical energy storage module (3, 13, 23, 33), in particular a voltage and/or a state of charge.

The first voltage rail 9 is electrically conductively connected to the control unit 2 and to the voltage connection 11, in particular a positive voltage connection part.

The second voltage rail 10 is electrically conductively connected to the control unit 2 and to the voltage connection 11, in particular a negative voltage connection part.

The electrical energy store 1 can be connected to a charging device and/or a load by means of the voltage connection 11.

According to the first switching configuration illustrated in FIG. 1, the electrical energy storage modules (3, 13, 23, 33) are arranged so as to be connected in parallel.

To this end, the respective first electrical connection means (7, 17, 27, 37) of each electrical energy storage module (3, 13, 23, 33) is electrically conductively connected to the first voltage rail 9 and the respective second electrical connection means (8, 18, 28, 38) of each electrical energy storage module (3, 13, 23, 33) is electrically conductively connected to the second voltage rail 10. The first voltage rail 9 thus electrically conductively connects all the first electrical connection means (7, 17, 27, 37) of the electrical energy storage modules (3, 13, 23, 33) of the electrical energy store 1 to one another. The second voltage rail 10 electrically conductively connects all the second electrical connection means (8, 18, 28, 38) of the electrical energy storage modules (3, 13, 23, 33) of the electrical energy store 1 to one another.

The first circuit configuration is suitable for slowly charging the electrical energy store 1 using a low voltage, for example 58 V for two-wheeled vehicles or 200 V for automobiles, for example overnight.

Figure 2:
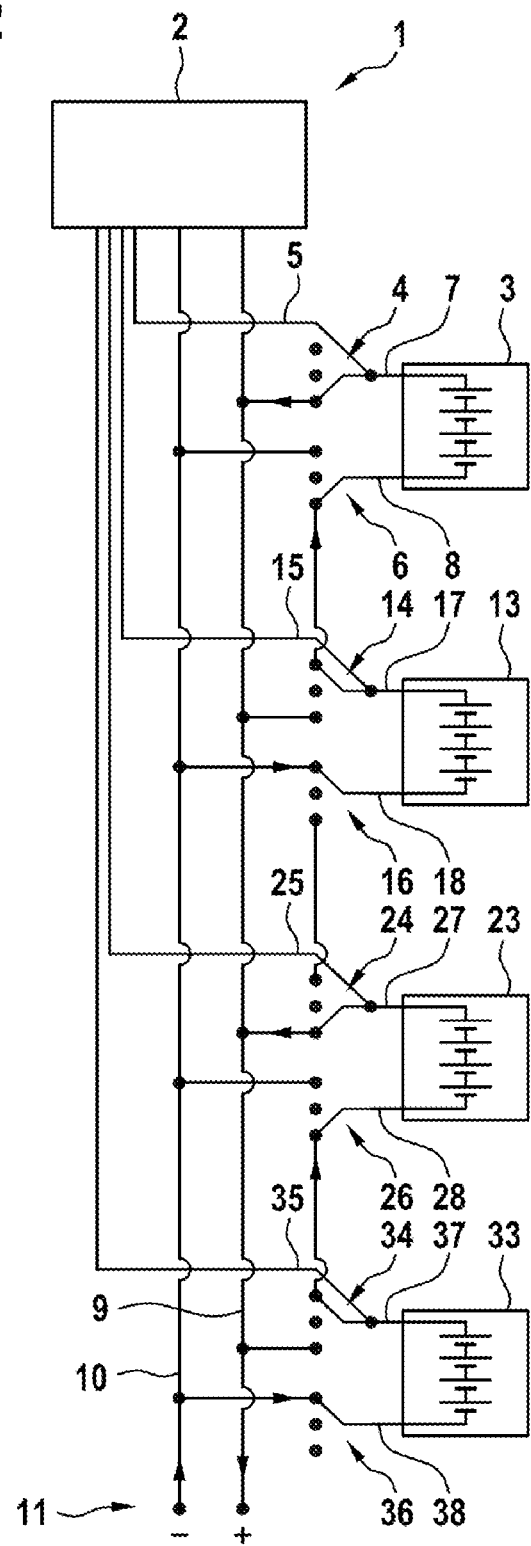
FIG. 2 shows a circuit diagram of an electrical energy store 1 according to the invention in a second switching configuration.

According to the second switching configuration illustrated in FIG. 2, in each case two electrical energy storage modules (3, 13, 23, 33) are arranged so as to be connected in a series circuit. The electrical energy storage modules (3, 13) connected in a series circuit are in turn arranged so as to be connected in parallel with further electrical energy storage modules (23, 33) connected in a series circuit.

To this end, a second electrical connection (8, 28) of a first electrical energy storage module (3, 23) and a first electrical connection (17, 37) of a second electrical energy storage module (13, 33) of the electrical energy storage modules (3, 13, 23, 33) connected in a series circuit are electrically conductively connected to one another. A first electrical connection (7, 27) of the first electrical energy storage module (3, 23) is electrically conductively connected to the first voltage rail 9. A second electrical connection (18, 38) of the second electrical energy storage module (13, 33) is connected to the second voltage rail 10.

The second circuit configuration is suitable for feeding a drive from the electrical energy store 1, for example using 116 V for two-wheeled vehicles or using 400 V for automobiles.

Figure 3:
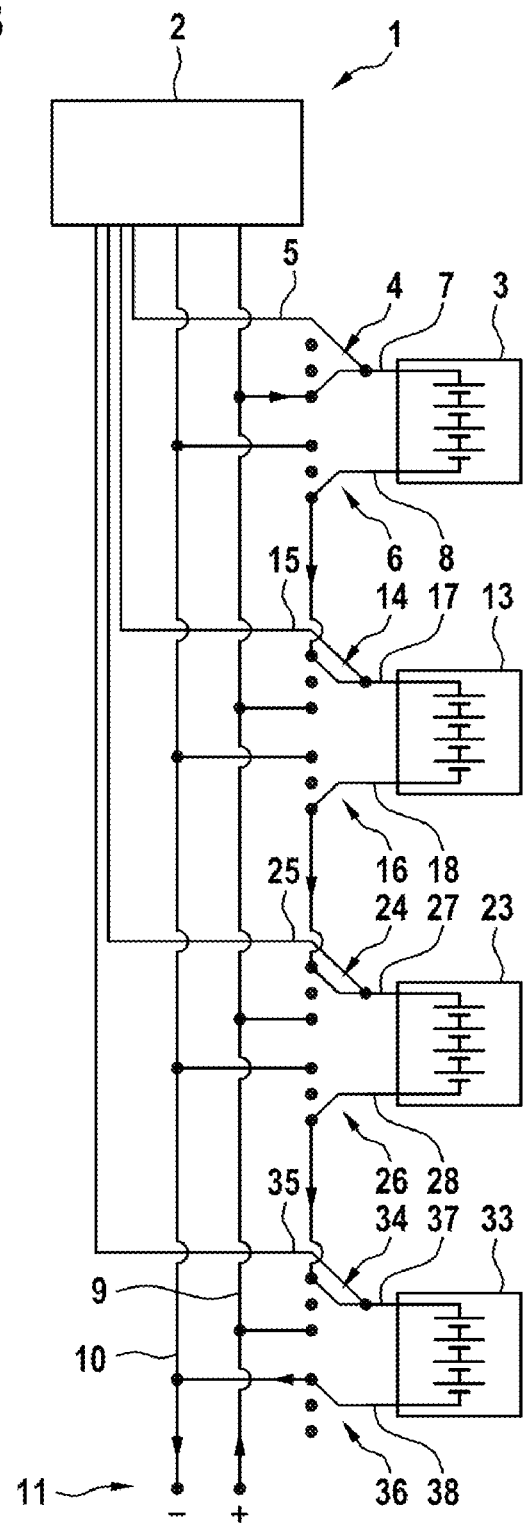
FIG. 3 shows a circuit diagram of an electrical energy store 1 according to the invention in a third switching configuration.

According to the third switching configuration illustrated in FIG. 3, all the electrical energy storage modules (3, 13, 23, 33) are arranged so as to be connected in a series circuit.

To this end, in each case a second electrical connection (8, 28) of an electrical energy storage module (3, 23) and a first electrical connection (17, 37) of a further electrical energy storage module (13, 33) are electrically conductively connected to one another. A first electrical connection (7, 27) of the first electrical energy storage module 3 in the series circuit is electrically conductively connected to the first voltage rail 9. A second electrical connection (18, 38) of the last electrical energy storage module 33 in the series circuit is connected to the second voltage rail 10.

The third circuit configuration is suitable for rapidly charging the electrical energy store 1, for example using 232 V for two-wheeled vehicles or using 800 V for automobiles.

Figure 4:
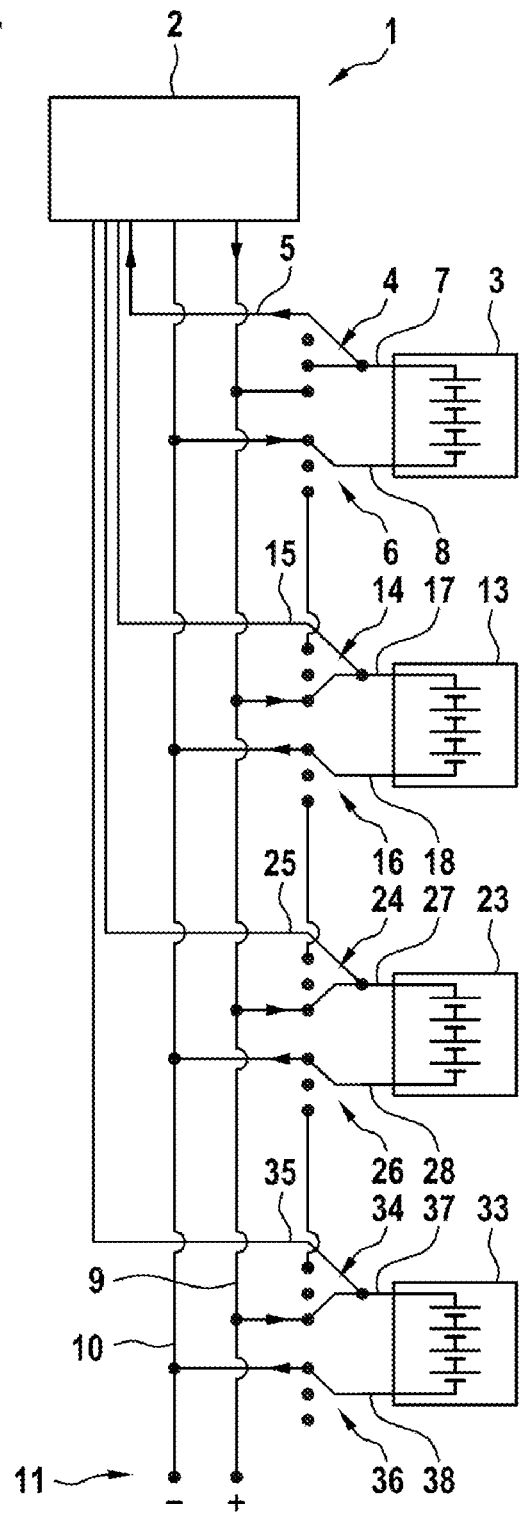
FIG. 4 shows a circuit diagram of an electrical energy store 1 according to the invention in a fourth switching configuration.

According to the fourth switching configuration illustrated in FIG. 4, three electrical energy storage modules (13, 23, 33) are arranged so as to be connected in parallel and a first electrical energy storage module 3 is electrically conductively connected to the first voltage rail 9 by means of the connecting means and the control unit 2.

To this end, the respective first electrical connection means (17, 27, 37) of each of the three electrical energy storage modules (13, 23, 33) is electrically conductively connected to the first voltage rail 9 and the respective second electrical connection means (18, 28, 38) of each of the three electrical energy storage modules (13, 23, 33) is electrically conductively connected to the second voltage rail 10. The first electrical connection means 7 of the first electrical energy storage module 3 is electrically conductively connected to the control unit 2 and the second electrical connection means 8 of the first electrical energy storage module is electrically conductively connected to the second voltage rail 10. To this end, the first switching element 4 of the first electrical energy storage module 3 is switched to the neutral position. The control unit 2 connects the first electrical connection means 7 of the first electrical energy store to the first voltage rail 9 and in so doing regulates the current that flows out of the first electrical energy storage module 3.

The first voltage rail 9 thus electrically conductively connects the first electrical connection means (17, 27, 37) of the three electrical energy storage modules (13, 23, 33) of the electrical energy store 1 and the control unit 2 to one another. The second voltage rail 10 electrically conductively connects all the second electrical connection means (8, 18, 28, 38) of the electrical energy storage modules (3, 13, 23, 33) of the electrical energy store 1 to one another.

In this case, the respective electrical energy storage module (3, 13, 23, 33) that is to be connected to the first voltage rail 9 by means of the control unit 2 can be selected on the basis of the state of charge of the electrical energy storage modules (3, 13, 23, 33).

The fourth circuit configuration is suitable for balancing the states of charge or voltages of the electrical energy storage modules (3, 13, 23, 33) of the electrical energy store 1. To this end, the electrical energy storage module 3 with the highest state of charge or the highest voltage is selected to be connected to the control unit 2. As a result, charge flows from the electrical energy storage module 3 with the highest state of charge or the highest voltage via the first and second voltage rails to the other three electrical energy storage modules (13, 23, 33). Preferably, the electrical energy storage module (13, 23, 33) with the lowest state of charge or the smallest voltage is in this case first of all connected to the voltage rails (9, 10).

Figure 5:
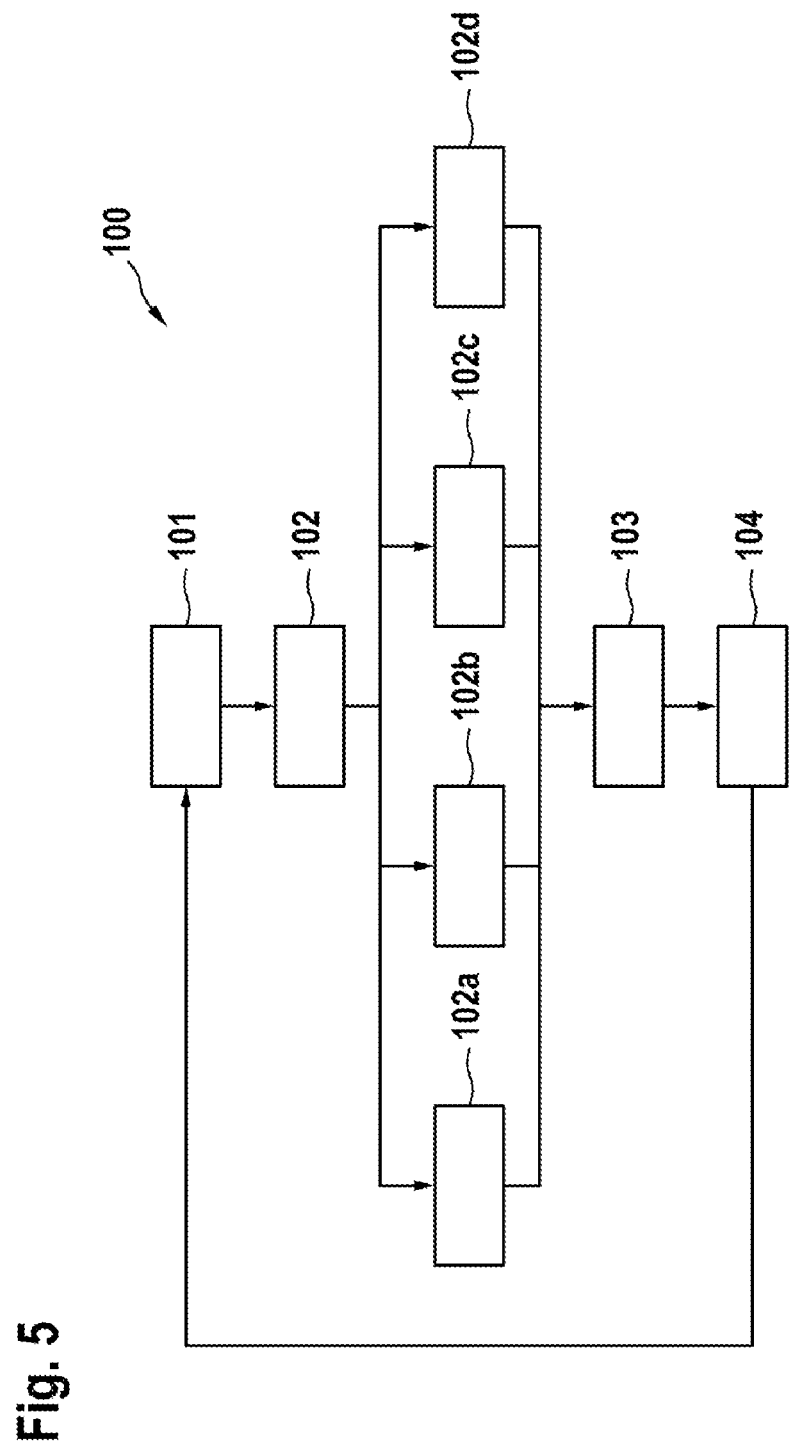
FIG. 5 shows a schematic illustration of a method 100, according to the invention, for operating an electrical energy store 1.

The method 100, according to the invention and illustrated in FIG. 5, for operating an electrical energy store 1 as described above has the following method steps:

In a first method step 101, a state of charge of the electrical energy store 1 is determined and an operating mode, in particular charging or fast charging or discharging or voltage balancing, of the electrical energy store 1 is set. To this end, a check is performed to determine whether the electrical energy store is connected to a charging device and, if it is, which charging voltage the charging device has.

In a second method step 102, switching elements (4, 6, 14, 16, 24, 26, 34, 36) are switched between electrical energy storage modules (3, 13, 23, 33) and voltage rails (9, 10) of the electrical energy store 1 in such a way that, according to a first variant 102a, all the electrical energy storage modules (3, 13, 23, 33) are connected in parallel or that, according to a second variant 102b, all the electrical energy storage modules (3, 13, 23, 33) are connected in a series circuit or that, according to a third variant 102c, groups of electrical energy storage modules (3, 13, 23, 33) connected in series are connected in parallel or that, according to a fourth variant 102d, a first electrical energy storage module 3 is electrically conductively connected to a control unit 2 and the other electrical energy storage modules (13, 23, 33) are connected in parallel, with the result that the other electrical energy storage modules (13, 23, 33) are fed from the first electrical energy storage module 3. The electrical energy storage module that has the highest state of charge and/or the highest voltage is selected as the first electrical energy storage module 3.

In a third method step 103, the electrical energy storage modules (3, 13, 23, 33) are electrically conductively connected to a charging device or a load.

In a fourth method step 104, the method is continued or ended with the first method step 101.

In this context, an electrical energy store is understood to mean a rechargeable energy store, in particular having an electrochemical energy storage cell and/or an energy storage module having at least one electrochemical energy storage cell and/or an energy storage pack having at least one energy storage module. The energy storage cell can be embodied as a lithium-based battery cell, in particular a lithium-ion battery cell. Alternatively, the energy storage cell is embodied as a lithium-polymer battery cell or nickel-metal hydride battery cell or lead-acid battery cell or lithium-air battery cell or lithium-sulfur battery cell.

In this context, a vehicle is understood to mean an at least partly electrically driven vehicle, in particular a land vehicle, for example an automobile or a truck or a two-wheeled vehicle. The vehicle is an electric battery-driven vehicle that has a purely electrical drive, or a hybrid vehicle that has an electrical drive and an internal combustion engine.

The invention claimed is:

1. An electrical energy store (1) comprising:
   at least two electrical energy storage modules (3, 13, 23, 33), each electrical energy storage module having a positive first electrical connection means (7, 17, 27, 37) and a negative second electrical connection means (8, 18, 28, 38),
   a control unit (2),
   a voltage connection (11), and
   first switching elements (4, 14, 24, 34) each corresponding to a respective one of the first electrical connection means (7, 17, 27, 37),
   second switching elements (6, 16, 26, 36) each corresponding to a respective one of the second electrical connection means (8, 18, 28, 38),
   wherein
   the electrical energy store (1) has a positive first voltage rail (9) and a negative second voltage rail (10) that are each connected to the voltage connection (11),
   wherein
   each of the first electrical connection means (7, 17, 27, 37) are configured to be connected to one of the positive first voltage rail (9), a neutral position, or to the second electrical connection means (8, 18, 28) of a further electrical energy storage module (3, 13, 23) via one of the respective first switching elements (4, 14, 24, 34), and
   each of the second electrical connection means (8, 18, 28, 38) are configured to be connected to one of the negative second voltage rail (10), a neutral position, or to the first electrical connection (17, 27, 37) of a further electrical energy storage module (13, 23, 33) via one of the respective second switching elements (6, 16, 26, 36).

2. The electrical energy store (1) according to claim 1, wherein
   the control unit (2) is electrically connected to the electrical energy storage modules (3, 13, 23, 33) the first voltage rail (9), and the second voltage rail (10),
   wherein the control unit (2) is electrically connected to the respective electrical energy storage module (3, 13, 23, 33) via a respective connecting means (5, 15, 25, 35), and
   wherein the respective connecting means (5, 15, 25, 35) has a lower dielectric strength than the first and second voltage rail (9, 10).

3. The electrical energy store (1) according to claim 1, wherein
   the control unit (2) is connected to the electrical energy storage modules (3, 13, 23, 33) and the switching elements (4, 6, 14, 16, 24, 26, 34, 36), in each case in a data-carrying manner, and
   wherein the control unit (2) is configured to evaluate status parameters of the electrical energy storage modules (3, 13, 23, 33) and to actuate the switching elements (4, 6, 14, 16, 24, 26, 34, 36) on the basis of the status parameters.

4. The electrical energy store (1) according to claim 1, wherein
   each electrical energy storage module (3, 13, 23, 33) has electrical energy storage cells that are arranged in a series circuit, and
   wherein each electrical energy storage module (3, 13, 23, 33) has the same number of electrical energy storage cells.

5. A vehicle comprising:
an electrical energy store (1) that includes
at least two electrical energy storage modules (3, 13, 23, 33), each electrical energy storage module having a positive first electrical connection means (7, 17, 27, 37) and a negative second electrical connection means (8, 18, 28, 38),
a control unit (2),
a voltage connection (11), and
first switching elements (4, 14, 24, 34), each corresponding to a respective one of the first electrical connection means (7, 17, 27, 37),
second switching elements (6, 16, 26, 36) each corresponding to a respective one of the second electrical connection means (8, 18, 28, 38),
wherein
the electrical energy store (1) has a positive first voltage rail (9) and a negative second voltage rail (10) that are each connected to the voltage connection (11),
wherein each of the first electrical connection means (7, 17, 27, 37) are configured to be connected to one of the positive first voltage rail (9), a neutral position, or to the second electrical connection means (8, 18, 28) of a further electrical energy storage module (3, 13, 23) via one of the respective first switching elements (4, 14, 24, 34), and
each of the second electrical connection means (8, 18, 28, 38) are configured to be connected to one of the negative second voltage rail (10), a neutral position, or to the first electrical connection (17, 27, 37) of a further electrical energy storage module (13, 23, 33) via one of the respective switching elements (6, 16, 26, 36).

6. A method (100) for operating an electrical energy store (1) that includes
at least two electrical energy storage modules (3, 13, 23, 33), each electrical energy storage module having a positive first electrical connection means (7, 17, 27, 37) and a negative second electrical connection means (8, 18, 28, 38),
a control unit (2),
a voltage connection (11), and
first switching elements (4, 14, 24, 34) each corresponding to a respective one of the first electrical connection means (7, 17, 27, 37),
second switching elements (6, 16, 26, 36) each corresponding to a respective one of the second electrical connection means (8, 18, 28, 38),
wherein
the electrical energy store (1) has a positive first voltage rail (9) and a negative second voltage rail (10) that are each connected to the voltage connection (11),
wherein each of the first electrical connection means (7, 17, 27, 37) are configured to be connected to one of the positive first voltage rail (9), a neutral position, or to the second electrical connection means (8, 18, 28) of a further electrical energy storage module (3, 13, 23) via one of the respective first switching elements (4, 14, 24, 34), and
each of the second electrical connection means (8, 18, 28, 38) are configured to be connected to one of the negative second voltage rail (10), a neutral position, or to the first electrical connection (17, 27, 37) of a further electrical energy storage module (13, 23, 33) via the respective second switching elements (6, 16, 26, 36) the method comprising:
in a first method step (101), determining a state of charge of the electrical energy store (1) and setting an operating mode of the electrical energy store (1),
in a second method step (102), switching elements (4, 6, 14, 16, 24, 26, 34, 36) between electrical energy storage modules (3, 13, 23, 33) and voltage rails (9, 10) of the electrical energy store (1), and
in a third method step (103), connecting the electrical energy storage modules (3, 13, 23, 33) to a charging device or a load.

7. The method (100) according to claim 6,
wherein,
in the second method step (102), controlling the switching elements to a first variant (102a) of switch positions, all the electrical energy storage modules (3, 13, 23, 33) are connected in parallel.

8. The method (100) according to claim 6,
wherein,
in the second method step (102), controlling the switching elements to a second variant (102b) of switch positions, all the electrical energy storage modules (3, 13, 23, 33) are connected in a series circuit.

9. The method (100) according to claim 6,
wherein,
in the second method step (102), controlling the switching elements to a third variant (102c) of switch positions, groups of electrical energy storage modules (3, 13, 23, 33) connected in series are connected in parallel.

10. The method (100) according to claim 6,
wherein,
in the second method step (102), controlling the switching elements to a fourth variant (102d) of switch positions, a first electrical energy storage module (3) is electrically conductively connected to the control unit (2) and the other electrical energy storage modules (13, 23, 33) are connected in parallel.

11. The method (100) according to claim 7,
wherein
controlling the switching elements to the fourth variant (102d) of switch positions, further electrical energy storage modules (13, 23, 33) are fed from the first electrical energy storage module (3), wherein the control unit (2) is configured to
limits the current from the first electrical energy storage module (3), or
select, as the first electrical energy storage module (3), the electrical energy storage module that has at least one of the highest state of charge or the highest voltage, or both.

12. The method (100) according to claim 6
wherein,
in the first method step (101), a check is performed to determine whether the electrical energy store (1) is connected to a charging device and, if the electrical energy storage module is, which charging voltage the charging device has.

13. The method (100) according to claim 6,
wherein,
charging or fast charging or discharging or voltage balancing of the electrical energy storage modules (3, 13, 23, 33) is selected as the operating mode.

* * * * *